US010013604B1

(12) United States Patent
Watson

(10) Patent No.: US 10,013,604 B1
(45) Date of Patent: Jul. 3, 2018

(54) FLEXIBLE FORM FACTOR OVERLAY DEVICE

(71) Applicant: X Development LLC, Mountain View, CA (US)

(72) Inventor: Philip Watson, Santa Cruz, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 15/192,830

(22) Filed: Jun. 24, 2016

(51) Int. Cl.
*G06K 9/00* (2006.01)
*G06K 9/20* (2006.01)
*G06F 17/28* (2006.01)

(52) U.S. Cl.
CPC ......... *G06K 9/00442* (2013.01); *G06F 17/28* (2013.01); *G06K 9/2036* (2013.01)

(58) Field of Classification Search
CPC ... G06K 9/00442; G06K 9/2036; G06F 17/28
USPC ................ 382/229, 112, 312; 235/491, 451, 235/472.01, 472.03; 250/208.1, 458.1; 356/71; 358/484, 475, 474; 362/293; 345/204, 691; 704/3
See application file for complete search history.

(56) References Cited

U.S. PATENT DOCUMENTS 4,785,357 A * 11/1988 Dreyfus ............. H04N 1/02835 358/473
4,890,230 A * 12/1989 Tanoshima ............. G06F 3/018 235/472.01
5,063,508 A 11/1991 Yamada et al.
5,280,333 A * 1/1994 Wunderer ................ G07D 7/12 235/491
7,209,268 B2 * 4/2007 Ikeda ..................... H04N 1/031 250/208.1
7,855,812 B2 12/2010 Gelsomini et al.
8,045,208 B2 10/2011 Lapstun et al.
8,284,218 B2 * 10/2012 Yoshida ............... G09G 3/2025 345/204
9,083,840 B2 * 7/2015 Mitsutake .......... H04N 1/02815
2011/0252316 A1 10/2011 Pahud et al.
2014/0253982 A1 * 9/2014 Mitsutake .......... H04N 1/02815 358/475
2015/0227509 A1 8/2015 Landau

FOREIGN PATENT DOCUMENTS

WO 2008101299 A1 8/2008

* cited by examiner

*Primary Examiner* — John Strege
(74) *Attorney, Agent, or Firm* — Fish & Richardson P.C.

(57) ABSTRACT

A device is provided that includes a light-sensing layer including photodetectors, a light guide arranged to direct light beams towards a document area, and an angle-selective layer arranged to filter light beams reflected from the document area based on respective angles of incidence of the reflected light beams. The device also includes a controller configured to: operate the light guide to emit light, such that a plurality of light beams is directed towards the document area, where a portion of the light beams is reflected off of the document area and filtered by the angle-selective layer to direct a subset of the reflected light beams to the light-sensing layer. The controller is also configured to receive data indicative of the subset of light beams, generate an image of a document in the document area, detect text in the image, translate the text, and display the translated text on a display.

14 Claims, 6 Drawing Sheets

602

600

FLEXIBLE FORM FACTOR OVERLAY DEVICE

BACKGROUND

Unless otherwise indicated herein, the materials described in this section are not prior art to the claims in this application and are not admitted to be prior art by inclusion in this section.

Devices that can be used to translate documents may take various forms. For example, some devices can capture an image of a document that is to be translated, and then use optical character recognition (OCR) to detect text in the image of the document. The device may then use translation software to translate the detected text. The translated text may then be displayed and/or played out (e.g., via a computerized voice) to the user.

SUMMARY

The present disclosure provides devices, systems, and processes that can be used to a conveniently capture an image of a document and modify the image of the document. In particular, a device may be a flexible contact device, which a user can place directly on a document that includes text. The device may capture an image of the document using image capturing components that include a light-sensing layer, an angle-selective layer, and a light guide. The device may then process the image to detect any text in the image of the document. The device may perform an action after detecting the text. For example, the device may translate the detected text. The device may then display the translated text above the original text in the document such that the device provides an augmented-reality style user-experience that simulates replacement of the text in the original document with the translated text.

In one example, the present application describes a device including: a light source operable to emit light; a light-sensing layer comprising one or more photodetectors; a light guide arranged to receive light from the light source and direct at least some of the received light towards a document area; an angle-selective layer arranged to filter light reflected from the document area such that at least one photodetector in the light-sensing layer receives light reflected from a respective sub-area of the document area below the at least one photodetector. The device also includes a controller configured to: operate the light source to emit light towards the light guide, such that a majority of the light from the light source is directed towards the document area by the light guide, where a portion of the majority of light is reflected off of the document area and filtered by the angle-selective layer to direct a portion of the reflected light to the light-sensing layer; receive data indicative of the portion of the reflected light as detected by the one or more photodetectors of the light-sensing layer; generate, based on the data, an image of a document in the document area; and detect text in the image of the document.

In another example, a method is described. The method involves operating a light source to emit light towards a light guide, such that a majority of the light from the light source is directed by the light guide towards a document area, where a portion of the majority of light is reflected off of the document area and filtered by an angle-selective layer to direct a portion of the reflected light to a light-sensing layer. The method also includes receiving data indicative of the portion of the reflected light as detected by one or more photodetectors of the light-sensing layer and generating, based on the data, an image of a document in the document area. The method also includes detecting text in the image of the document.

In a third example, a device is described. The device includes a light source operable to emit light; a light-sensing layer comprising one or more photodetectors; a light guide arranged to receive light from the light source and direct at least some of the received light towards a document area; an angle-selective layer arranged to filter light reflected from the document area such that at least one photodetector in the light-sensing layer receives light reflected from a respective sub-area of the document area below the at least one photodetector; and a display. The device also includes a controller configured to: operate the light source to emit light towards the light guide, such that a majority of the light from the light source is directed towards the document area by the light guide, where a portion of the majority of light is reflected off of the document area and filtered by the angle-selective layer to direct a portion of the reflected light to the light-sensing layer; receive data indicative of the portion of the reflected light as detected by the one or more photodetectors of the light-sensing layer; generate, based on the data, an image of a document in the document area; detect text in the image of the document; translate the text from a first language to a second language; generate a second image comprising text in the second language; and cause the display to display the second image.

In another example, a system is described that includes means for operating a light source to emit light towards a light guide, such that a majority of the light from the light source is directed by the light guide towards a document area, where a portion of the majority of light is reflected off of the document area and filtered by an angle-selective layer to direct a portion of the reflected light to a light-sensing layer. The system also includes means for receiving data indicative of the portion of the reflected light as detected by one or more photodetectors of the light-sensing layer. The system also includes means for generating, based on the data, an image of a document in the document area. The system also includes means for detecting text in the image of the document.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
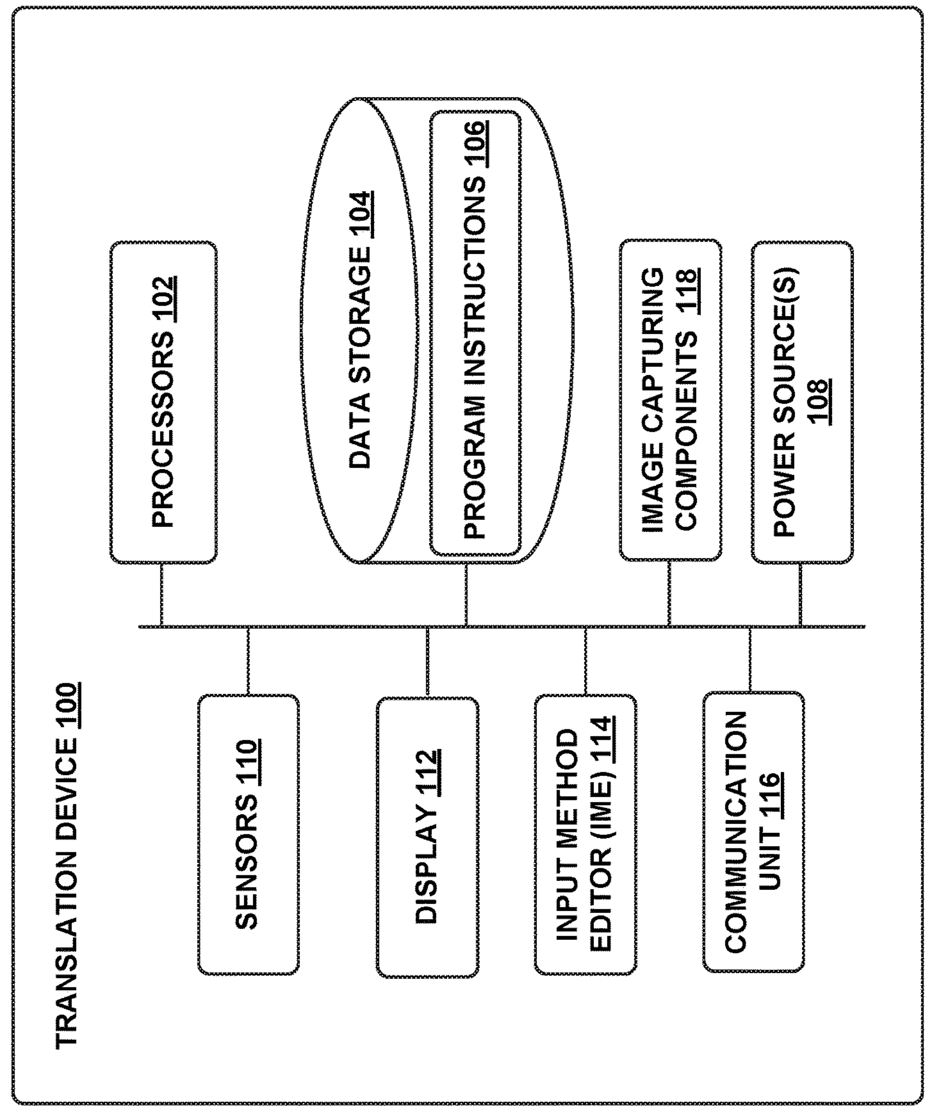
FIG. 1 is a simplified block diagram depicting components of a translation device, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

As explained above, various devices are currently being used to translate documents. Existing translators may use a charge-coupled device (CCD) array, such as a camera or a scanner, to capture an image of a document, such as a page of a magazine or textbook. Some existing devices, such as a tablet or mobile phone that include a camera, may capture an image of the document and may translate the text in the image of the document. Other existing devices, such as a scanner, may transmit a captured image to a computing device that can process the captured image to translate the text in the document.

However, existing devices may not offer a seamless user experience to a user that would like to easily read a translation of text in a physical document. For example, a device that utilizes a camera, such as a mobile phone or tablet, can't be placed directly on a page as the camera may not be able to focus in order to capture an image of the document. Further, even if the device is held at a distance from the page, the device's unnatural ergonomics for capturing images of books, magazines, and other types of paper-based documents makes alignment of the device with a document difficult. Further, the user may have to constantly adjust the positioning of the device such that the image frame is completely filled and/or such that text is not warped in the image.

Furthermore, existing devices that allow for direct contact scanning, e.g., scanners, are typically bulky and not portable. Further, such peripheral devices rely on a computing device in order to translate any text in the document and to display the translated text. As such, a user needs to access the computing device in order to access the translation of the document. Further, using a scanner can be tedious as the user may have to access the scanner every time the user comes across a page that the user would like to translate.

Disclosed herein is a portable contact device that can capture an image of a document when the device is placed directly on the document. The device includes image capturing components that can provide contact scanning of documents. As such, the device may capture an image of a document when the device is placed on the document. Further, the device may analyze the captured image in order to detect any text included in the document. In an embodiment, the device may then translate and display the detected text. In other embodiments, the device may perform other actions after detecting the text in the document. For example, the device may display the text such that a user may modify the text. The user may annotate, augment, or otherwise modify a document.

In an embodiment, the device may be a thin and flexible device. A user may place the device above the document that includes text and/or images. The device may capture an image of the document and may then detect any formatting, graphics, images, and designs in the original document from the image of the document. In an embodiment, the device may then generate an image that is a translated rendering of the original document. The generated image may include the formatting and graphic information of the original document. The device may then display the generated image on a display of the device.

In another embodiment, the device may be a thin, transparent, and flexible device that includes transparent or translucent components. A user may place the transparent device above the text in a document. The device, after translating the text in the document, may display the translated text above the text in the original document, while the non-text portions (e.g., images and other graphics) of the document may be viewed directly through the transparent device. As such, the device may provide the user with an augmented-reality user experience where the user may view a translated version of the original document.

In an embodiment, the image capturing components of the device may include a light-sensing layer, an angle-selective layer, and a light guide. The image capturing components may capture an image without the use of a photographic lens that redirects light towards a CCD array (i.e., the components that are used in devices such as scanners and cameras). Rather, the image capturing components may capture an image of the document by directing light from the light guide plate towards the document. The light that is reflected off of the document is directed towards the angle-selective layer. The angle-selective layer may filter the reflected light such that a portion of the reflected light reaches the image-sensing layer. More specifically, the angle-selective layer allows light that is reflected from an area of the document that is opposite to a photodetector to reach that photodetector. Therefore, the translation device may be able to determine the area of the document from which the incident light was reflected and thus may be able to generate an image of the document. Further, this arrangement of image capturing components allows the device to capture an image of the document while in contact with the document.

II. Example Systems and Methods

FIG. 1 is a block diagram showing components of a device 100, according to an exemplary embodiment. In an embodiment, the translation device 100 may include one or more processors 102, data storage 104, program instructions 106, power source(s) 108, sensors 110, display 112, and Input Method Editor (IME) 114. Note that the device 100 is shown for illustration purposes only and that the translation device 100 may include additional components and/or have one or more components removed without departing from the scope of the disclosure. Further, note that the various components of the device 100 may be arranged and connected in any manner. Further, the device 100 may be a thin and flexible device. As such, the various components of the device 100 may be manufactured from flexible materials or arranged on flexible substrates. For instance, the device 100 may include flexible printed circuit boards (PCBs). Further, the device 100 may be a transparent or translucent device. As such, at least some of the components of the device 100 may be formed from transparent materials or arranged on transparent substrates.

The display 112 may be located on a first side of the device 100. The display 112 may include light-emitting elements (e.g., LEDs, OLEDs, LCD, reflective LCD, etc.).

The display may be an electrophoretic display or electrochromic display. Further, the display 112 may include flexible elements, e.g., the display 112 could include a flexible OLED display. A flexible display may take on other forms (e.g., flexible bistable LCD, flexible e-ink screen, etc.). Further, the display may be a transparent display, such as a transparent and flexible OLED display. A transparent display may be used to display images in augmented-reality where the images appear to interact with or overlay the real-world view perceived by the user. Yet further, the display 112 may be a touchscreen display. In an example, the display 112 may show a graphical user interface (GUI) that may provide an application through which a user of the device may interact with the systems disclosed herein.

The device 100 may receive a user input via the IME 114. In particular, the IME 114 may allow for interaction with the GUI such as for scrolling, providing text, and/or selecting various features of the application, among other possible interactions. The IME 114 may take on various forms. In one example, the IME 114 may be a pointing device such as a computing mouse used for control of the GUI. However, if the display 112 is a touch screen display, a user touch input can be received (e.g., such as using a finger or a stylus) that allows for control of the GUI.

In another example, the IME 114 may be a text IME such as a keyboard that provides for selection of numbers, characters and/or symbols to be displayed via the GUI. For instance, in the arrangement where the display 112 is a touch screen display, portions of the display 112 may show the IME 114. Thus, touch-input on the portion of the display 112 including the IME 114 may result in user-input such as selection of specific numbers, characters, and/or symbols to be shown on the GUI via the display 112. In yet another example, the IME 114 may be a voice IME that receives audio input, such as from a user via a microphone of the device 100, that is then interpretable using one of various speech recognition techniques into one or more characters that may be shown via the display 112. Other examples may also be possible.

The communication unit 116 may include wired links and/or wireless links (e.g., using various wireless transmitters and receivers). A wired link may include, for example, a parallel bus or a serial bus such as a Universal Serial Bus (USB). A wireless link may include, for example, Bluetooth, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, infrared (IR) pulse, or any optical link, among other possibilities. A wired link may include, for example, an Ethernet, Universal Serial Bus (USB), or High-Definition Multimedia Interface (HDMI) port. The device may use the communication unit 116 to connect with other devices such as remote servers and/or computing devices.

The device 100 may be coupled with one or more sensors 110 such as proximity sensors, motion sensors (e.g., gyroscopes, and/or accelerometers), infrared sensors, optical sensors, a Near Field Communication (NFC) chip, wireless sensors, light sensors, touch sensors (e.g., capacitive sensors), cameras (e.g., color cameras, grayscale cameras, and/or infrared cameras), among others.

The device 100 may also include a power source 108. The power source 108 may include power management circuitry. The power source 108 may also include a battery power interface and/or an external power interface. The battery power interface may be configured to receive operating power from a battery source, such as an internal battery, a removable battery that is electrically coupled to the device 100, or any other sort of battery or similar type of portable power supply now known or later developed. The battery that supplies operating power for the device 100 via the battery interface may be rechargeable or non-rechargeable.

In some embodiments, the device 100 may include an audio output device. The audio output device may include one or more devices configured to convert electrical signals into audible signals (e.g., sound pressure waves). As such, the audio output device may take the form of headphones (e.g., over-the-ear headphones, on-ear headphones, ear buds, wired and wireless headphones, etc.), one or more loudspeakers, or an interface to such an audio output device (e.g., a ¼" or ⅛" tip-ring-sleeve (TRS) port, a USB port, etc.). In an example embodiment, the audio output device may include an amplifier, a communication interface (e.g., BLUETOOTH interface), and/or a headphone jack or speaker output terminals. Other systems or devices configured to deliver perceivable audio signals to a user are possible.

In some embodiments, the device may include a braille output device or surface. In such embodiments, the braille output device may be used in lieu of the display 112. In an example, the braille output device may be configured to output text that is detected by the device 100. In another example, the braille output device may output a modified version of the text that is detected by the device 100. For example, the braille output device may output a translation of the detected text.

The processors 102 may include one or more general purpose processors, and/or one or more special purpose processors (e.g., digital signal processors, graphics processing units, application specific integrated circuits, etc.). Further, the data storage 104 can include one or more computer-readable storage media that can be read and/or accessed by at least one of the processors 102. The one or more computer-readable storage media can include volatile and/or non-volatile storage components, such as optical, magnetic, organic or other memory or disc storage, which can be integrated in whole or in part with at least one of the processors 102. In some embodiments, the data storage 104 can be implemented using a single physical device (e.g., one optical, magnetic, organic or other memory or disc storage unit), while in other embodiments, the data storage 104 can be implemented using two or more physical devices.

The processors 102 may be capable of executing program instructions (e.g., compiled or non-compiled program logic and/or machine code) stored in the data storage 104 to carry out the various functions described herein. Therefore, the data storage 104 may include a non-transitory computer-readable medium, having stored thereon program instructions that, upon execution by the device 100, cause the device 100 to carry out any of the methods, processes, or operations disclosed in this specification and/or the accompanying drawings. The execution of program instructions by the processors 102 may result in the processors 102 using data provided by various other elements of the device 100.

The data storage 104 can include computer-readable program instructions 106 and perhaps additional data. In some embodiments, the data storage 104 can additionally include storage required to perform at least part of the herein-described methods and techniques and/or at least part of the functionality of the devices and networks. For example, the data storage 104 may include one or more spelling dictionaries, translation dictionaries, and/or grammar analysis tools. The spelling dictionaries and the grammar analysis tools may be in more than one language. Further, the data storage 104 may include software such as OCR software.

In an embodiment, the device 100 may be operable to display a GUI on the display 112. For example, the GUI may provide an application that a user may use to interact with the device 100. The device 100 may also be operable to receive input from the user using the IME 114. For example, the user input may be indicative of one or more settings of the device 100, such as the source language of the document and the preferred output language. In another example, the user input may be indicative of an instruction to capture an image of a document.

The device 100 may also be operable to cause the image capturing components 118 to capture an image of a document (i.e., source document) onto which the device has been placed. The device 100 may receive data from the image capturing components 118 that is indicative of the document. The device 100 may be operable to generate an image of the document based on the data. The document may be a color or a black and white document. Accordingly, the generated image may be a color image or a black and white image.

The device 100 may also be operable to process the captured image. For example, the device 100 may use OCR to detect text in the document. In an embodiment, the device 100 may include OCR software, such that the device 100 may process the image to detect any text in the image. The device 100 may also be operable to detect any graphical and formatting information in the document. Further, the device 100 may be operable to store the source document's graphic and formatting information and/or the detected text in the data storage 104.

The device 100 may also be operable to display the detected text. A user of the device may then annotate, augment, or modify the detected text. The device 100 may also be operable to translate the detected text. Translating the detected text may include determining the language of the detected text. The device 100 may then translate the detected text to a second language. For example, the device 100 may use the one or more dictionaries and grammar analysis tools, which are stored in the data storage 104, in order to translate the text. A user may specify the desired language to which the text is translated.

In other embodiments, the device 100 may be operable to establish one or more connections with one or more devices using the communication unit 116. For example, the device 100 may connect to one or more remote servers that can process an image and/or translate text detected in the image. In another example, the device 100 may send the image, via the communication unit 116, for processing at another computing device. For example, the device 100 may be a peripheral of another computing device, such as a mobile phone or tablet. The computing device may have better processing capabilities/power than the device 100. Accordingly, the computing device may be better suited to process the image than the device 100. The computing device may receive the image from the device 100, and may process the image to detect text in the image. The computing device may then send the detected text back to the device 100. In some embodiments, the computing device may also translate the detected text. The computing device may then send the translated text to the device 100.

The device 100 may also be operable to display the translated text on the display 112. For example, the device 100 may generate an image that includes the translated text. The translated text in the generated image may have similar formatting to text in the source document. Further, the image may include any pictures, illustrations, and/or designs that were included in the source document. In another example, the device 100 may be a transparent device that includes a transparent display. In such an example, the device 100 may be operable to display the translated text above the corresponding text in the document. Further, the other sections of the document (i.e., sections that don't include text) may be visible to the user through the transparent device. Such an arrangement provides the user with an augmented-reality style user experience where the user may view the original document with the translated text overlaying the original text.

Figure 2:
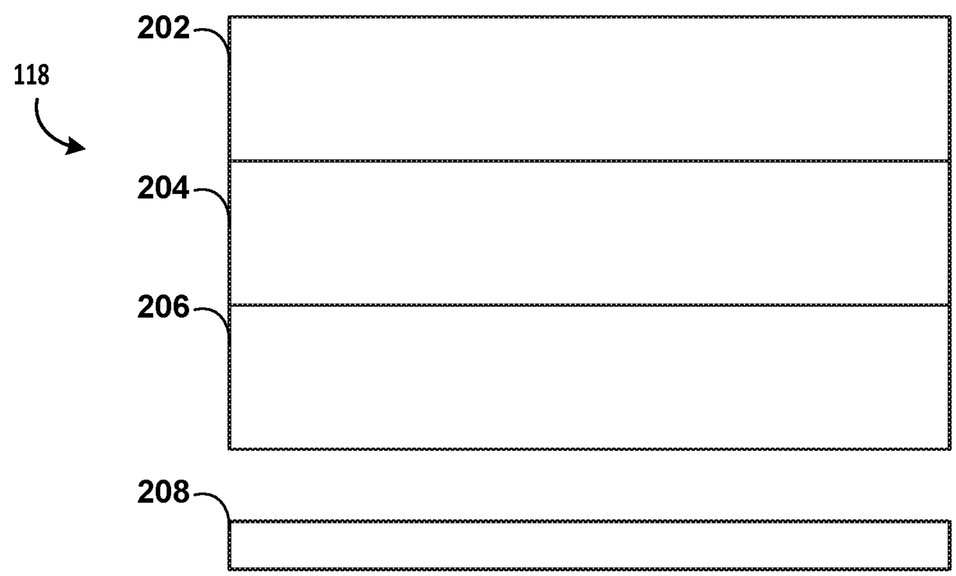
FIG. 2 is a simplified diagram depicting image capturing components, according to an example embodiment.

FIG. 2 illustrates the image capturing components 118, according to an exemplary embodiment. In an embodiment, the image capturing components may include a light-sensing layer 202, an angle-selective layer 204, and a light guide plate 206. Note that the image capturing components 118 are shown for illustration purposes only and the image capturing components 118 may include additional components and/or have one or more components removed without departing from the scope of the disclosure. Further, note that the image capturing components 118 may be arranged and connected in any manner. For example, the light guide plate 206 may be placed below the angle-selective layer 204, and the angle-selective layer 204 may be placed below the light-sensing layer 202. Further, as illustrated in FIG. 2, the image capturing components 118 may be directly coupled to one another. In another example, there may be separation between one or more of the image capturing components 118.

FIG. 2 also illustrates a document 208 (i.e., source document). In an embodiment, when a device is placed on the document 208, the image capturing components 118 may be in direct contact with the document 208. In another embodiment, there may be a small separation distance between the image capturing components 118 and the document 208 when the device is placed on the document 208. The small separation distance may be on the order of millimeters or centimeters. For example, there may be a protective layer or substrate between the document 208 and the image capturing components 118.

Figure 3:
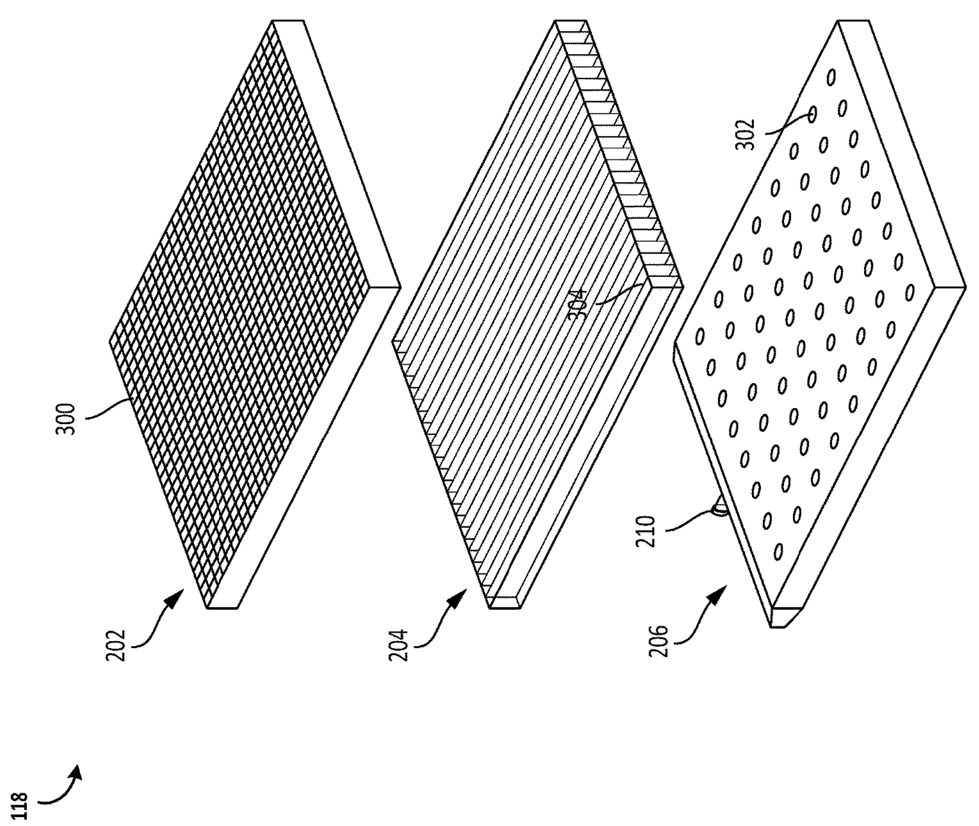
FIG. 3 is another diagram depicting image capturing components, according to an example embodiment.

FIG. 3 illustrates a perspective view of the image capturing components 118, according to an exemplary embodiment. In an embodiment, the light-sensing layer 202 may include one or more photodetectors that are arranged on a surface of the light-sensing layer 202. As illustrated in FIG. 3, the light-sensing layer 202 may include an array of photodetectors 300 arranged on a surface of the light-sensing layer 202. The array of photodetectors 300 may be able to detect incident light. In an example, the photodetectors may be thin film semiconductors. More specifically, the semiconductors may be thin-film transistors (TFT) or thin-film devices (TFD). For example, the TFTs/TFDs may be amorphous silicon TFTs/TFDs or Indium Gallium Zinc Oxide TFTs/TFDs. Other types of semiconductors may be used.

In an embodiment, the light-sensing layer 202 may include a flexible plastic or glass substrate on which the array of photodetectors is arranged. In another example, the light-sensing layer 202 may be manufactured from a light sensitive material such as light-sensing fibers. In yet another example, the light-sensing layer 202 may include one or more photodiodes. In another example, the light-sensing layer 202 may be a transparent and flexible light-sensing layer. Such a light-sensing layer may include a polymer film diffused with fluorescent particles. Other types of transparent light-sensing layers may include transparent organic photodetectors. Other types of flat form and flexible light-sensing layers may be possible.

The angle-selective layer 204 may be a thin film polymer layer that may be coupled to the light-sensing layer 202. In an embodiment, the angle-selective layer 204 may be arranged to filter light. For instance, the angle-selective layer 204 may be arranged to filter light based on each portion of light's angle of incidence with the angle-selective layer 204.

In an embodiment, the angle-selective layer 204 may include microlouvers 304 separated by gaps. As illustrated in FIG. 3, the microlouvers 304 may be parallel along a width of the angle-selective layer 204. The microlouvers 304 may be oriented such that light incident on the angle-selective layer 204 with a certain angle can propagate through the gaps between the microlouvers 304, while light that is incident on the angle-selective layer with another angle may be absorbed by the microlouvers. In an example, light that is incident on the layer at a right angle to the layer may propagate through the gaps of the angle-selective layer 204. On the other hand, light that is incident on the layer at an oblique may be absorbed by the microlouvers 304 of the angle-selective layer 204. In an embodiment, the microlouvers 304 may be formed in a one-dimensional array. In another embodiment, the microlouvers 304 may be formed in a two-dimensional array.

The light guide plate 206 may be a low-scattering flexible light guide plate that includes a light emitting source, e.g., a side-emitting LED 210. Other types of light emitting sources may be possible. Further, the light guide plate 206 may include one or more microstructures on the surface or embedded within the light guide plate 206. As illustrated in FIG. 3, the light guide plate 206 includes a plurality of microstructures 302 on the surface of the light guide plate 206. The light guide plate 206 may use the microstructures 302 to redirect light from the LED 210 towards a preferential direction. For example, the light guide plate 206 may use the microstructures to redirect light towards a document that is placed beneath the image capturing components 118. In some embodiments, the light guide plate 206 may be flexible and transparent. Such a light guide plate may be manufactured using a flexible polymer material.

The example image capturing components provided in FIGS. 2 and 3, and the accompanying description herein is for illustrative purposes only and should not be considered limiting. For example, in another implementation, the image capturing components 118 may include inexpensive cameras that are arranged in an array. The cameras may be configured to take overlapping images of specific areas of the document. The device may then generate an image of the document based on the images captured by each of the cameras. In another implementation, the angle selection may be part of the light-sensing layer 202. For example, a tiny hollow black tube that is formed onto each detector element in a detector array may selectively allow light to reach each detector element.

Figure 4:
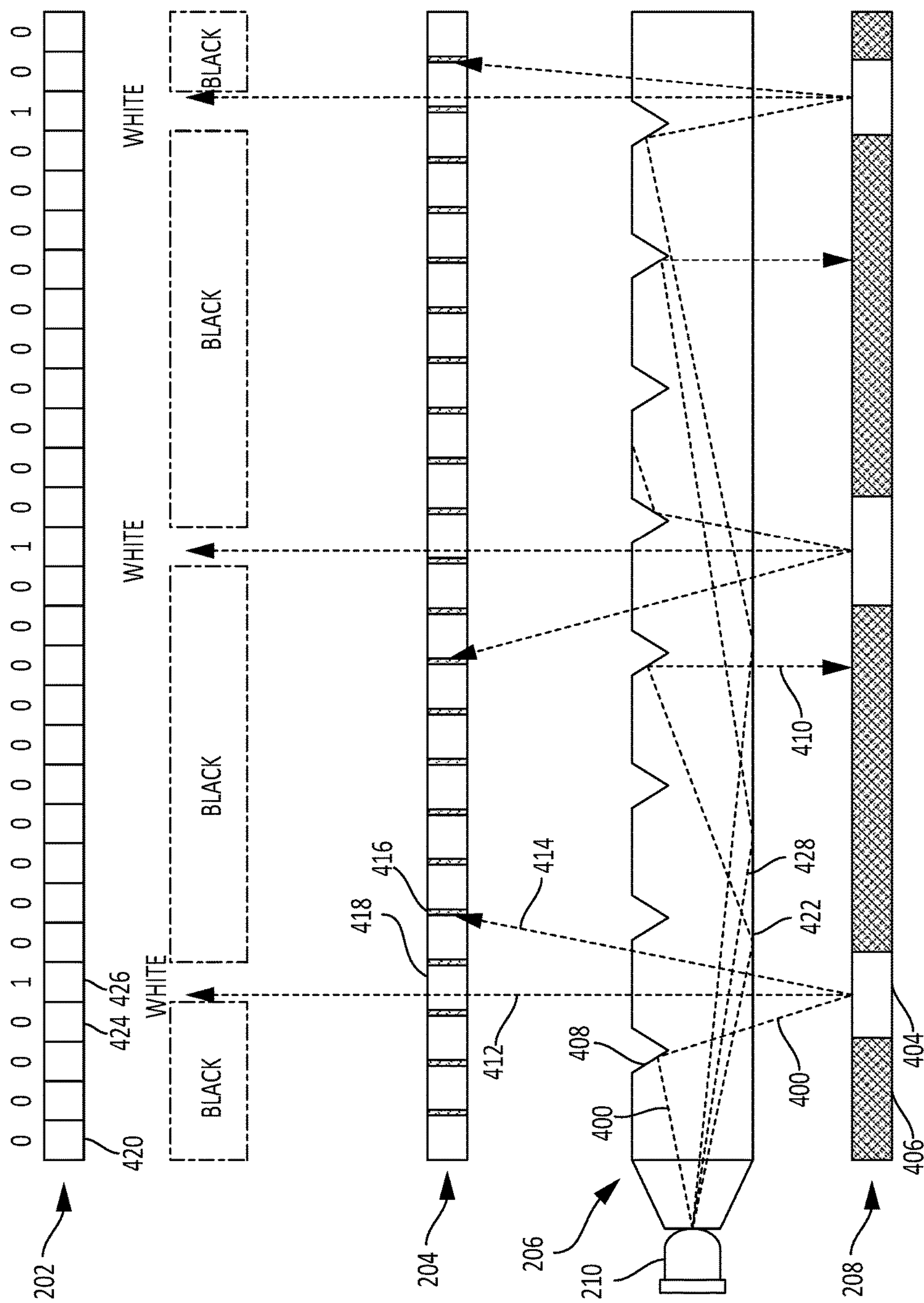
FIG. 4 is another diagram depicting image capturing components, according to an example embodiment.

FIG. 4 illustrates the image capturing components of a device, according to an exemplary embodiment. In particular, FIG. 4 shows the imaging components as described in reference to FIGS. 2 and 3 in greater detail. In the illustrated configuration, the light-sensing layer 202 may include an array of photodetectors that are configured to detect incident light. For example, as explained below, the light-sensing layer 202 may detect light that may be reflected off of the document 208. Note, that the light, for the sake of clarity, is represented as light rays.

In an example, the device may cause the side-emitting LED 210 of the light guide plate 206 to emit light, e.g., light ray 400, into the light guide plate 206. The light guide plate 206 may include a plurality of surface microstructures, e.g., microstructure 408. Each surface microstructure may redirect incident light towards the document 208. For example, the microstructure 408 may redirect the incident light ray 400 towards the document 208. As illustrated in FIG. 4, not all of the light that is emitted by the LED 210 is directly incident on a microstructure. Some light, such as the light represented by light ray 428, may first be reflected off a reflective surface 422 towards a microstructure. The light may then be reflected from the microstructure towards the document 208.

Furthermore, in this example, the document 208 is a black and white document. The black and white portions of the document 208 may correspond to areas with ink and blank space on the document 208 respectively. As illustrated in FIG. 4, light may be incident on a black and/or white area of the document 208. For example, light ray 400 is incident on a white area of the document 208. The light ray 400 may be diffusely reflected off of the document 208. As illustrated, the light ray 400 may be reflected off the document 208 as light rays 412 and 414. The light ray 410, however, may be incident on a black area of the document 208. Light that is incident on a black area of the document 208 may not be reflected off of the document 208. Note that in other implementations, the light may reflect off of different areas of the document 208 with varying intensities, which may be indicative of the colors of the document 208.

The reflected light, e.g., light rays 412 and 414, may propagate towards the angle-selective layer 204. As explained above, the light guide 206 may be manufactured from a transparent polymer material. As such, the reflected light may propagate through the top surface of the light guide plate 206. More specifically, the reflected light may propagate through areas of the light guide plate 206 that don't include microstructures.

In an embodiment, each photodetector in the light-sensing layer 202 may be configured to detect light that is reflected from an area of the document 208 that is substantially normal to the photodetector (i.e., the area of the document 208 that is substantially opposite to the photodetector). As such, light that is reflected along the normal vector from an area on the document 208 (i.e., reflected at a right angle from the document 208) may be directed towards the area's corresponding photodetector. However, as explained above, light that is incident on the document 208 may be diffusely reflected at a plurality of angles. Light that is reflected at an angle other than a substantially right angle may propagate towards a photodetector that does not correspond to the area of the document 208 from which the light was reflected.

The angle-selective layer 204 may act as a filter to light that is reflected off of the document 208. The angle-selective layer 204 may inhibit crosstalk by blocking light that is reflected towards a photodetector to which the light does not correspond. In the example illustrated in FIG. 4, the angle-selective layer 204 may be designed such that light that is reflected substantially normal to the document 208 may propagate through the angle-selective layer 204. Further, the angle-selective layer 204 may be designed such that light that is reflected from the document 208 at angles other than a substantially right angle may be absorbed by the angle-selective layer 204.

As illustrated in FIG. 4, the angle-selective layer 204 may be a thin film that includes microlouvers separated by gaps. Light that is reflected substantially normal to the document 208 may pass through a gap of the angle-selective layer 204 in order to reach a corresponding photodetector. Further, the microlouvers may be oriented such that they block light that is reflected at oblique angles. The light that is absorbed by the microlouvers doesn't reach the light-sensing layer 202. For example, the light ray 412 represents light that is reflected at a right angle from the document 208. The light may pass through the gap 418 of the angle-selective layer 204. Conversely, the light ray 414, which is reflected at an oblique angle from the document 208, may be absorbed by the microlouver 416.

By preventing crosstalk, the angle-selective layer 204 may ensure that each photodetector receives light from an area of the document 208 that is opposite to the photodetector. As such, the device may determine the area of the document 208 from which the light incident on the light-sensing layer 202 was reflected.

Further, the light-sensing layer 202 may generate data indicative of the incident light on the light-sensing layer 202. The device may use the data to generate an image of the document 208. In an embodiment, the data generated by the light-sensing layer 202 may be binary data. That is, a photodetector that detects incident light may register a value of 1, whereas a photodetector that does not detect incident light may register a value of 0. In the example of FIG. 4, as light may be deflected from a white region on the document 208, a photodetector that registers a value of 1 may be determined to correspond to a white region on the document 208. That is, the device may determine that the area of the document 208 that corresponds to the photodetector that registered a value of 1 is an area that includes a blank space. Conversely, the device may determine that the area of the document 208 that corresponds to a photodetector that registered a value of 0 is a dark region (e.g., an area with ink).

As illustrated in FIG. 4, the areas that correspond to photodetectors that registered a value of 0 are black, whereas the areas that correspond to photodetectors that registered a value of 1 are white. Further, the device may determine the areas of the document 208 that the data from each photodetector is indicative of since each photodetector may receive light from an area of the document 208 that is opposite to the photodetector. Accordingly, the device may generate a black and white image of the document 208 based on the data from the light-sensing layer 202.

In another implementation, the light-sensing layer 202 may generate data indicative of the intensity of the light incident on the light-sensing layer 202. In such an implementation, light may be reflected off of the document 208 with varying intensities. Further, the device may use the detected light intensities to generate a grayscale image of the document. In another implementation, the light-sensing layer 202 may detect color images and may generate data indicative of the coloring on the document 208. In such an implementation, the photodetectors may be covered with color filters such that the device may differentiate between colors based on the light that is incident on the light-sensing layer 202. Additionally and/or alternatively, the LEDs (e.g., LED 210) may sequentially flash red, green, and blue light. The device may read the signals that are detected by the light-sensing layer 202 during each sequence to determine the coloring of the document 208. Other methods of detecting and/or generating grayscale and/or color images are possible.

Further, the device may process the generated image of the document 208. For example, the device may use OCR to detect any text in the generated image. The device may also detect images, graphics, designs, and other formatting information of the document 208. The device may store the detected data. Further, the device may translate the detected text. The output language may be a user-specified output language. In some examples, the device may process the image on-board, while in other examples the device may send the image for processing at another computing device (e.g., remote server).

The device may then display the translated text. In an embodiment, the device may use the translated text and the stored data (e.g., image, graphics, etc.) to generate an image that is a rendering of the document 208, albeit with translated text. The device may display the generated image on the display of the device. In another embodiment, the device may be a transparent device that includes transparent components. In such an example, the device may display the text above the corresponding text in the document 208. Further, the portions of the display that don't include text may be visible through the transparent device. Such a device may provide a user with an augmented-reality style of user experience that allows the user to easily read the translated text of any document.

Further, note that the light guide 206 does not refract light as the light propagates from the light guide 206 to the angle-selective layer 204. In this example, the reflection angle of a light ray may be the same as the angle of incidence of the light ray on the angle-selective layer 204. In some examples, the light may be refracted as the light propagates from the light guide plate 206 to the angle-selective layer 204. Further note, that an angle that is a substantially right angle means that the angle is within a threshold of a right angle. For example, a substantially right angle may be an angle that has a difference less than five degrees from the right angle.

Figure 5:
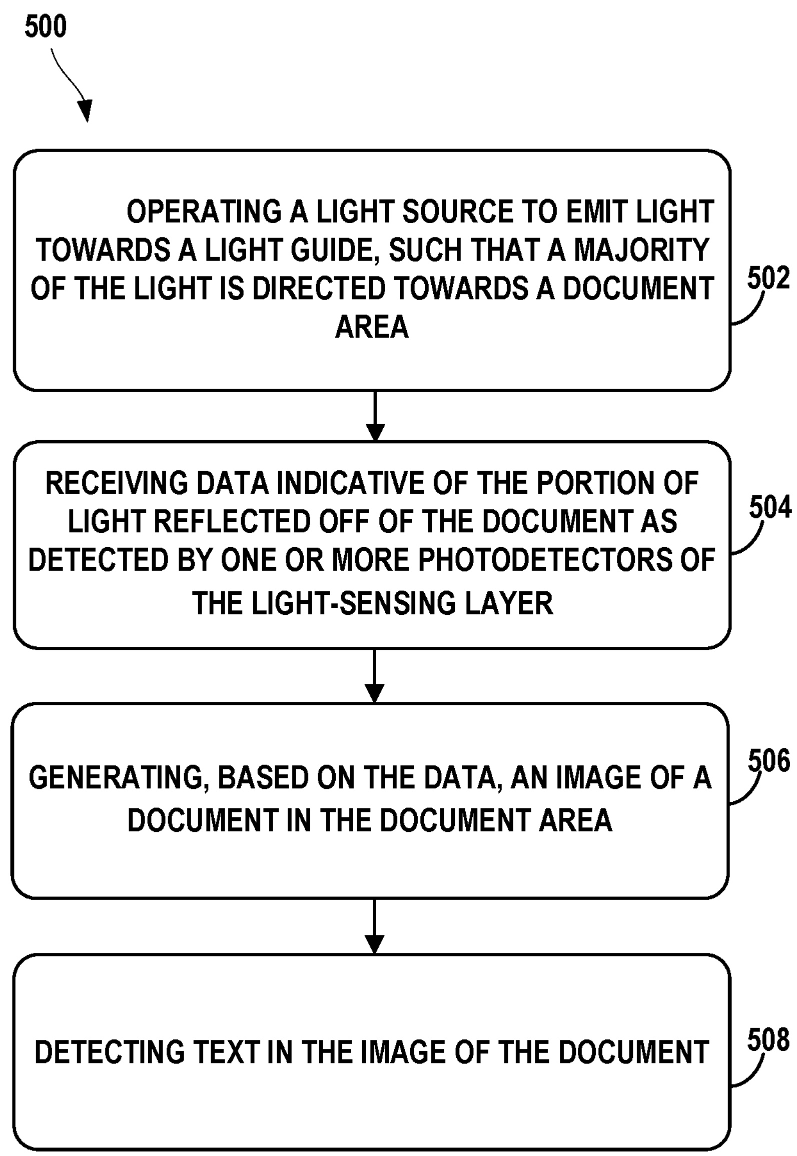
FIG. 5 is a flow chart illustrating a method, according to an example embodiment.

FIG. 5 is a flow chart illustrating a method 500, according to an example embodiment. The blocks of method 500 may be carried out by a processor or controller of a device that includes the components described in FIGS. 1-4. Further, part or all of method 500 may be carried out by a local processor of a device, such as processors 102 illustrated in FIG. 1. In additional examples, part or all of method 500 may be carried out by a remote controller of a device (e.g., a mobile smartphone to which a device is tethered).

Furthermore, it is noted that the functionality described in connection with method 500 and other processes described herein can be implemented as special-function and/or configured general-function hardware modules, portions of program code executed by a processor for achieving specific logical functions, determinations, and/or steps described in connection with method 500 and other processes described herein. Where used, program code can be stored on any type of computer-readable medium, for example, such as a storage device including a disk or hard drive.

In addition, each block of the flowchart shown in FIG. 5 may represent circuitry that is wired to perform the specific logical functions in the process. Unless specifically indicated, functions in the flowchart shown in FIG. 5 may be executed out of order from that shown or described, including substantially concurrent execution of separately described functions, or even in reverse order in some examples, depending on the functionality involved, so long as the overall functionality of the described method is maintained.

At block 502, the method 500 may include operating a light source to emit light towards a light guide, such that a majority of the light from the light source is directed towards a document area. The light source may be part of a device (e.g., device 100 in FIG. 1) that is placed on the document to be translated. Further, the light source may be part of the image capturing components of the device. For instance, the image capturing components may be the components described in FIGS. 2, 3, and 4.

At block 504, the method 500 further includes receiving data indicative of the portion of light reflected off of the document as detected by one or more photodetectors of the light-sensing layer.

At block 506, the method 500 further includes generating, based on the data, an image of a document in the document area. At block 508, the method 500 further detecting text in the image of the document. In some embodiments, the method 500 may further include translating the text from a first language to a second language and causing a display to display the translated text.

Figure 6:
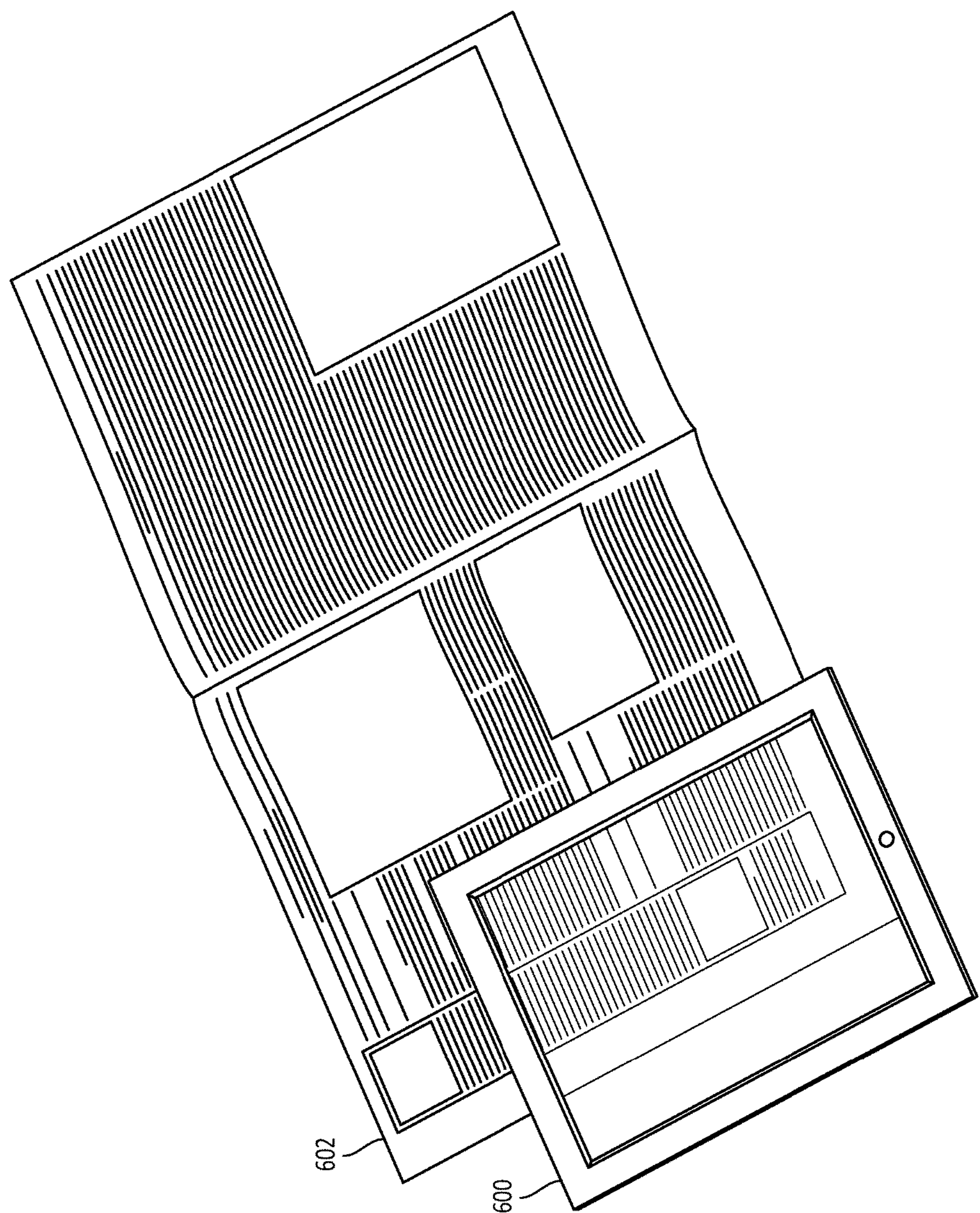
FIG. 6 depicts a translation device placed on a document, according to an example embodiment.

FIG. 6 illustrates a translation device 600, according to an exemplary embodiment. The translation device 600 may be placed on a document such as a page of magazine 602. In an embodiment, the translation device 600 may capture an image of the page 602. The translation device 600 may use the image capturing components described herein. Further, the translation device may use the data from the captured image to detect any text in the image of the page 602. In an embodiment, the translation device 600 may process the captured image in order to detect text in the image. In another embodiment, the translation device 600 may send the image to a computing device for processing. For example, the translation device 600 may send the image to a remote server (e.g., a cloud based server). The server may process the image and send back relevant data to the translation device 600. For example, the server may send the detected text back to the translation device 600.

Further, the translation device 600 may translate the detected text. In an embodiment, the translation device 600 may translate the text. In another embodiment, the translation device 600 may send the detected text to a computing device to be translated. For example, the translation device 600 may send the text to a remote server for translation. The server may translate the text to a specified language, and may send the translated text to the translation device 600. The translation device 600 may display the translated text on a display of the device.

In some embodiments, a device may include the image capturing components disclosed herein in order to scan or capture an image of a document. Such a device may be implemented as a portable scanning device and may not include the translating functionality of the translation device disclosed herein. In other embodiments, the scanning device may include other functionalities such as annotating, augmenting, and/or modifying text that is detected in the captured image of the document.

V. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of a method described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A device comprising:

a light source operable to emit light;

a light-sensing layer comprising one or more photodetectors;

a light guide arranged to receive light from the light source and direct at least some of the received light towards a document area;

an angle-selective layer arranged to filter light reflected from the document area such that at least one photodetector in the light-sensing layer receives light reflected from a respective sub-area of the document area below the at least one photodetector, wherein the angle-selective layer comprises microlouvers separated by gaps; and a controller configured to:

operate the light source to emit light towards the light guide, such that a majority of the light from the light source is directed towards the document area by the light guide, wherein a portion of the majority of light is reflected off of the document area and filtered by the angle-selective layer to direct a portion of the reflected light to the light-sensing layer, wherein the portion of the reflected light reaches the light-sensing layer by propagating through the gaps;

receive data indicative of the portion of the reflected light as detected by the one or more photodetectors of the light-sensing layer;

generate, based on the data, an image of a document in the document area;

detect text in the image of the document;

translate the text from a first language to a second language; and cause a display to display the translated text.

2. The device of claim 1, wherein the device is a transparent device comprising a transparent display that displays the translated text directly above the text in the document area, and wherein sub-areas of the document area that do not include the text are visible through the transparent device.

3. The device of claim 1, wherein the angle-selective layer filters the reflected light such that parts of the reflected light that are reflected off of the document at substantially oblique angles are absorbed by the angle-selective layer.

4. The device of claim 1, wherein the portion of the reflected light is incident on the angle-selective layer at a substantially right angle to the angle-selective layer.

5. The device of claim 1, wherein the light-sensing layer comprises an array of photodetectors arranged on a flexible substrate.

6. The device of claim 1, wherein the light guide comprises a plurality of microstructures arranged to redirect the majority of the light from the light source towards the document area.

7. The device of claim 6, wherein the light guide is formed from a flexible polymer material.

8. A method comprising:

operating a light source to emit light towards a light guide, such that a majority of the light from the light source is directed by the light guide towards a document area, wherein a portion of the majority of light is reflected off of the document area and filtered by an angle-selective layer to direct a portion of the reflected light to a light-sensing layer, wherein the angle-selective layer comprises microlouvers separated by gaps, and wherein the portion of reflected light reaches the light-sensing layer by propagating through the gaps;

receiving data indicative of the portion of the reflected light as detected by one or more photodetectors of the light-sensing layer;

generating, based on the data, an image of a document in the document area;

detecting text in the image of the document;

translating the text from a first language to a second language; and causing a display to display the translated text.

9. The method of claim 8, wherein the angle-selective layer is arranged to filter light reflected from the document area such that at least one photodetector in the light-sensing layer receives light reflected from a respective sub-area of the document area below the at least one photodetector.

10. The method of claim 8, wherein the angle-selective layer filters the reflected light such that parts of the reflected light that are reflected off of the document at substantially oblique angles are absorbed by the angle-selective layer.

11. The method of claim 8, wherein the light guide comprises a plurality of microstructures arranged to redirect the light from the light source towards the document area.

12. A device comprising:

a light source operable to emit light;

a light-sensing layer comprising one or more photodetectors;

a light guide arranged to receive light from the light source and direct at least some of the received light towards a document area;

an angle-selective layer arranged to filter light reflected from the document area such that at least one photodetector in the light-sensing layer receives light reflected from a respective sub-area of the document area below the at least one photodetector, wherein the angle-selective layer comprises microlouvers separated by gaps;

a display; and a controller configured to:

operate the light source to emit light towards the light guide, such that a majority of the light from the light source is directed towards the document area by the light guide, wherein a portion of the majority of light is reflected off of the document area and filtered by the angle-selective layer to direct a portion of the reflected light to the light-sensing layer, wherein the portion of the reflected light reaches the light-sensing layer by propagating through the gaps;

receive data indicative of the portion of the reflected light as detected by the one or more photodetectors of the light-sensing layer;

generate, based on the data, an image of a document in the document area;

detect text in the image of the document;

translate the text from a first language to a second language;

generate a second image comprising text in the second language; and cause the display to display the second image.

13. The device of claim 12, wherein the light guide comprises a plurality of microstructures arranged to redirect the majority of the light from the light source towards the document area.

14. The device of claim 12, wherein the light-sensing layer comprises an array of photodetectors arranged on a flexible substrate.

* * * * *